July 26, 1932.   M. S. MEAD, JR   1,869,209
THERMIONIC MEASURING DEVICE
Filed Oct. 16, 1931

Inventor:
Milton S. Mead, Jr.
by Charles E. Tullar
His Attorney.

Patented July 26, 1932

1,869,209

UNITED STATES PATENT OFFICE

MILTON S. MEAD, JR., OF SCHENECTADY, NEW YORK, ASSIGNOR TO GENERAL ELECTRIC COMPANY, A CORPORATION OF NEW YORK

THERMIONIC MEASURING DEVICE

Application filed October 16, 1931. Serial No. 569,288.

My invention relates to thermionic measuring devices and in particular to arrangements for measuring products of quantities in electric circuits.

My invention has for its principal object the provision of devices for measuring either true power or the reactive component of volt-amperes in high frequency circuits. Other objects will become apparent as the description proceeds.

In accordance with my invention I make use of the property of vacuum tubes of the four-element or screen-grid type whereby variations in the potential of the control grid may be made proportional to one of the measured quantities and variations in the mutual conductance of the tube may be made proportional to the other of the measured quantities so that the output of the tube is dependent upon the instantaneous product of the quantities to be measured. I find that by working within a certain range of the output curve the plate current may be made to vary linearly with the grid potential and the mutual conductance of the tube may be varied linearly with the potential of the screen grid. By suitably biasing both the control grid and the screen grid and by using a pair of tubes in a balanced or push-pull connection to balance out the steady direct-current component of the plate current, I am able to obtain an indication of the net current in the plate circuits which is substantially directly proportional to the product of external voltages applied to the control grid and the screen grid respectively. As my device is made truly responsive to instantaneous values I may obtain indications of the true power or of the actual reactive component of kilo-volt amperes as well as indications proportional to the kilo-volt amperes or the product of the effective values of current and voltage in a high frequency circuit. A device of this kind is useful, for example, in alternating current calculating tables using high frequency instead of 60 cycle current.

The features of my invention which I believe to be novel and patentable will be pointed out in the appended claims.

Figure 1:
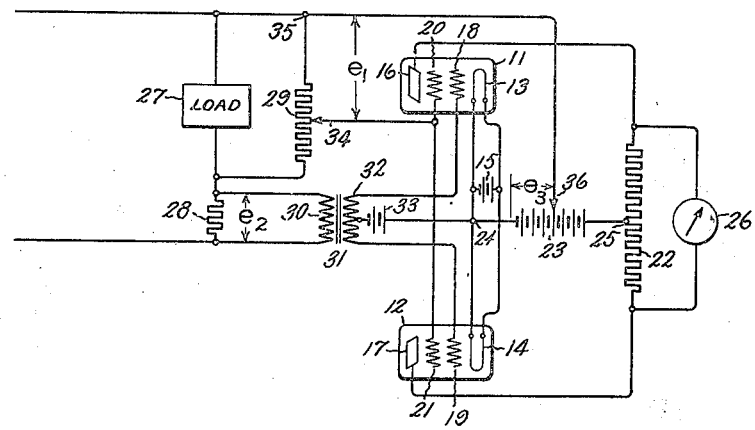
Figure 2:
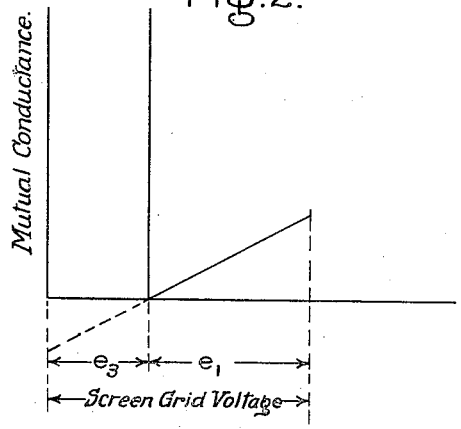

In order to afford a more complete understanding of my invention reference is made in the following description to the accompanying drawing in which Fig. 1 represents a schematic diagram of the electrical circuits of the apparatus employed in carrying out my invention and Fig. 2 is a curve illustrating the relationship between the mutual conductance of the tubes and the voltage applied to the screen grid.

Referring to the drawing, I may employ a pair of four-element vacuum tubes 11 and 12 comprising filamentary cathodes 13 and 14 heated by means of battery 15, anodes or plates 16 and 17, control grids 18 and 19 and screen grids 20 and 21. Although my invention might be carried out with a single tube I prefer to use a pair of tubes as the most convenient method of balancing out the steady direct-current component of the plate current. The tubes are connected with their cathodes 13 and 14 joined and with their plates 16 and 17 connected to opposite ends of a resistor 22 with the plate battery 23 connected between the common terminal 24 of the cathodes 13 and 14 and the mid point 25 of the resistor 22.

When the grids 18 to 21 of the tubes are unexcited or when both tubes are subjected to equal conditions, the same plate current will tend to flow in each tube and opposite ends of the resistor 22 will be at equal potential. Relative variations in the plate currents of tubes 11 and 12 will result in differences in potential between the ends of the resistor 22, producing indications in an instrument 26, connected across the resistor 22. For the purpose for which my device is primarily intended, I prefer to use a direct-current galvanometer as the instrument 26, but it will be understood that I might also employ an alternating-current instrument, a relay or some other current responsive instrument, or, for example, an oscillograph element responsive to instantaneous values.

The load of the circuit to be measured is represented at 27 and has connected in series therewith a current shunt 28 and in shunt therewith a voltage divider 29. The current shunt 28 is connected to the primary 30 of a current transformer 31 having a secondary winding 32. The opposite ends of the secondary winding 32 are connected to the grids 18 and 19 of the vacuum tubes 11 and 12 and the mid point of the winding 32 is connected to the negative terminal of a grid battery 33, the positive terminal of which is connected to the common terminal 24 of the cathodes 13 and 14. In consequence the grids 18 and 19 are given a suitable negative bias and the potentials thereof are oppositely varied in accordance with the variations in the current flowing through the shunt 28. Although I prefer to use a transformer 30, it will be understood that the grids 18 and 19 and battery 23 might also be connected directly to the ends and to the mid point of shunt 28.

The tap 34 connected to potentiometer or voltage divider 29 is joined to the screen grids 20 and 21 causing variations in the potential of screen grids 20 and 21 proportional to the variations in the voltage of the load 27. The screen grids 20 and 21 are biased to a given positive potential $e_3$ by connecting the terminal 35 of the potentiometer 29 to a tap 36 on the plate battery 23.

By balancing out the steady direct-current component of plate current of the tubes 11 and 12 and working within a certain range which will be understood by those skilled in the art, a net plate current is obtained from the tubes which varies proportionately with variations in the external voltage applied to the grids and the mutual conductances of the tubes. The mutual conductance of a vacuum tube in accordance with the terminology generally employed in the art is a characteristic of the tube expressed by the ratio of the change in plate current to the change in the voltage of the control grid which produces the change in plate current. The magnitude of the grid biasing potential 33 is such as to maintain a linear relationship between the variations in plate current and grid potential and the magnitude of the screen grid biasing voltage $e_3$ is such as to maintain a linear relationship between the variations in screen grid voltage and mutual conductance.

Referring to Fig. 2 which represents a curve of mutual conductance plotted against screen grid voltage for a given negative bias of the control grid, the solid portion of the curve represents the portion which is substantially linear. The dotted portion represents a continuation of this portion of the curve to the vertical axis. It will be seen that this line crosses the horizontal line at a point corresponding to screen grid voltage=$e_3$. By biasing the screen grids 20 and 21 with a voltage $e_3$, variations in mutual conductance are obtained which are not merely linear but also proportional to variations in the voltage $e_1$ obtained from the potentiometer 29 measuring the voltage of load 27.

Since the mutual conductance of a screen grid vacuum tube remains at zero for screen grid voltages below the critical value, this amount of this bias would tend to cut off the half of the power wave which corresponds to negative values of the instantaneous load voltage. However, the indications of instrument 26 will, nevertheless, be proportional to the power of load 27.

It will be understood that I may also bias the screen grid to a sufficiently high potential to maintain it positive at all times. In this case a given positive value of mutual conductance will correspond to zero load voltage thereby introducing into the plate current a component of the same phase and frequency as the load current. But since the galvanometer 26 is a direct current instrument, its indications will be unaffected.

Should I desire to substitute an alternating current instrument or a device responsive to instantaneous values for the galvanometer 26 and still maintain the screen grids at a positive potential at all times I may balance out the alternating component of plate current due to the excess positive screen grid bias and the load current by means of any suitable arrangement known in the art, for example, that set forth in U. S. Patent No. 1,566,034 to John Mills. Since the grids 18 and 19 are oppositely connected the difference between the plate currents of the tubes will be proportional to the drop $e_2$ across the shunt 28, and since the tubes 11 and 12 are connected in opposition the indications of the galvanometer 26 are proportional to differences in plate current. Accordingly, the current flowing in galvanometer 26 will be proportional to the voltage $e_2$.

Since the variations in mutual conductance of the tubes are proportional to the voltage $e_1$ obtained from the potentiometer 29 the variations in the net plate current flowing through galvanometer 26 will be proportional to the product of $e_1$ and $e_2$ which will indicate the value of the product of the instantaneous values of the current and voltage of load 27.

The instantaneous voltage of load 27 may be represented by the equation
$$e_1 = k \times E \sin wt$$
and instantaneous values of current may be represented by
$$e_2 = k' \times I \sin (wt - \phi)$$
where $E$ represents the effective value of voltage of load 27, $I$ represents the effective value of current, $w$ is a constant, $t$ represents time, $\phi$ represents the phase angle between current and voltage, and $k$ and $k'$ are constants of proportionality. The current flowing in the galvanometer 26 is represented by the equation
$$x = e_1 e_2.$$
If the values of $e_1$ and $e_2$ are substituted and the equation is simplified we obtain the equation
$$x = k'' EI [\cos \phi - \cos (2wt - \phi)]$$

where $k''$ is a constant of proportionality. As is well understood by those skilled in the art the instantaneous value of power represented by $x$ consists of two components, one a direct-current component containing the constant factor $\cos \phi$ and the other an alternating current component containing the sinusoidal factor $\cos (2wt - \phi)$. Since the average value of the cosine of a variable angle is zero the direct-current component of the current $x$ represents the average value of the power flowing in the load 27. Accordingly, if the galvanometer 26 is an oscillograph element responsive to instantaneous values my device may be utilized to obtain a record of instantaneous values of power. If instrument 26 is a direct-current galvanometer it will measure the direct-current component of $x$ which is $k''$ $EI$ $\cos \phi$, the magnitude of the vector product of the time vectors $e_1$ and $e_2$, giving an indication of the true value of the power consumed in the alternating-current load 27. obviously by adjusting the grid voltages to a certain value for each reading, the direct current galvanometer could be calibrated to read phase angle instead of power. If the instrument 26 is an alternating-current instrument instead of a direct-current instrument it will disregard the direct-current component of current, measuring only the alternating-current component so as to obtain an indication which is proportional to the average value of the alternating-current component which in turn is proportional to the maximum values of the instantaneous power so as to give an indication of the apparent power or volt-amperes consumed by load 27.

If the resistance shunt 28 is replaced by an inductive shunt the variations in potential of the grids 18 and 19 will be in quadrature with the variations in the instantaneous values of the current flowing in the load 27, and the current in galvanometer 26 will be proportional to the instantaneous values of the reactive component of the apparent power of load 27. If a direct-current galvanometer is utilized as the instrument 26, my device becomes an instrument measuring the effective value of the reactive component of the apparent power.

Although I have shown my device as one responsive to the products of current and voltage of an alternating-current circuit and primarily one for measuring true power of an alternating-current circuit, it will be understood that my device is not limited to measuring these quantities but may be utilized for measuring the products of any two quantities which may be made to control a pair of voltages and may be arranged to give indications of the magnitudes of such products either in the form of products of instantaneous values, scalar products of effective values or vector products of time vectors.

Although my device is applicable to measurements of direct-current quantities or low frequency alternating-current quantities it is obviously of particular value in measuring high frequency alternating-current quantities since the devices customarily employed are ordinarily inoperative or inaccurate at high frequencies which do not interfere with the operation of vacuum tube devices.

While I have described my invention in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the appended claims.

What I claim as new and desire to secure by Letters Patent of the United States, is:

1. In an instrument responsive to the product of two quantities, a four-element vacuum tube comprising a cathode, a plate, and a pair of grids, means for causing the potentials of said grids to vary in accordance with variations in the magnitudes of said measured quantities respectively, means for energizing said tube, and means responsive to the output thereof to provide an indication of the product of said quantities.

2. In an instrument responsive to a product of the instantaneous values of two quantities, a four-element tube comprising a cathode, a plate, and a pair of grids, a source of plate potential, and means for causing variations in the potentials of said grids each in accordance with the variations in the instantaneous values of one of said two quantities to produce a plate current varying in response to variations in the product of said quantities.

3. In an instrument responsive to the magnitude of the time vector product of two quantities oscillating in value with a given frequency, a four-element tube comprising a cathode, a plate and a pair of grids, a source of plate potential, means for causing variations in the potentials of said grids each in accordance with the variations in the values of one of said two quantities to produce a plate current varying in response to variations in the product of said quantities, and a device responsive to variations in the average value of said plate current.

4. In combination with an electrical circuit an instrument responsive to the product of the instantaneous values of two quantities in said circuit, a four-element tube comprising a cathode, a plate, and a pair of independent grids, a source of plate potential, means for causing variations in the potentials of said grids each in accordance with the variations in the instantaneous values of one of said quantities to produce a plate current varying in response to variations in the product of said quantities.

5. In an instrument responsive to the product of current and voltage in an electric circuit, a four-element tube comprising a cathode, a plate, and a pair of independent grids, a source of plate potential, means for causing variations in the potential of one of said grids in accordance with the variations in current, and means for causing variations in the potential of the other of said grids in accordance with the variations in the voltage of said electric circuit to produce a plate current varying in response to variations in the product of current and voltage.

6. In a thermionic wattmeter a four-element tube comprising a cathode, a plate, and a pair of independent grids, a source of plate current, and means for causing variations in the potential of one of said grids in accordance with variations in current and means for causing variations in the potential in the other of said grids in accordance with variations in voltage to produce a plate current varying in response to variations in power.

7. In an instrument responsive to the product of two quantities, a pair of balanced four-element tubes each comprising a cathode, a plate, a control grid and a screen grid, a common source of plate potential, and means for causing variations in the potentials of said screen grids in accordance with variations in one of said quantities and means for causing respectively opposite variations in the potentials of said control grids in accordance with the variations in the other of said quantities to produce a net plate current varying in response to variations in the product of said quantities.

8. In combination with an electric circuit a thermionic wattmeter, a pair of balanced four-element tubes, each comprising a cathode, a plate connected in opposition to the plate of the other tube, a control grid and a screen grid, a source of common potential, means for causing respectively opposite variations in the potentials of said control grids of the tubes in accordance with the current in said circuit, and means for causing variations in the potentials of the screen grids of said tubes in accordance with the voltage of said circuit to produce a net plate current varying in response to variations in the power of said circuit and means responsive to the average value of said net plate current.

In witness whereof, I have hereto set my hand.

MILTON S. MEAD, Jr.